United States Patent [19]

Rawdon et al.

[11] Patent Number: 5,140,716
[45] Date of Patent: Aug. 25, 1992

[54] CARGO RAIL SYSTEM FOR AN AIRCRAFT

[75] Inventors: Blaine K. Rawdon, Rancho Palos Verdes; Myles A. Rohrlick, Oceanside; Robert A. Wright, Santa Ana, all of Calif.

[73] Assignee: McDonnell Douglas Corporation, Long Beach, Calif.

[21] Appl. No.: 648,281

[22] Filed: Jan. 31, 1991

[51] Int. Cl.⁵ .............................................. B60P 7/00
[52] U.S. Cl. ................................. 14/71.1; 198/468.1; 198/740; 198/741; 244/137.1; 414/525.1; 414/535; 414/537
[58] Field of Search ............... 14/70, 71.1, 71.3, 71.5, 14/71.7; 414/537, 535, 525.1; 244/137.1, 137.4, 118.1; 198/740, 741, 468.1

[56] References Cited

U.S. PATENT DOCUMENTS

| | | |
|---|---|---|
| 3,203,527 | 8/1965 | Daetwyler .......................... 193/35 |
| 3,524,412 | 8/1970 | Wilson ............................... 104/134 |
| 3,606,842 | 9/1971 | Verbick ............................. 105/369 B |
| 4,039,163 | 8/1977 | Shorey ............................... 244/137 |
| 4,072,242 | 2/1978 | Cook .................................. 214/522 |
| 4,101,081 | 7/1978 | Ritter et al. ....................... 241/101.7 |
| 4,235,399 | 11/1980 | Sholey ............................. 414/537 X |
| 4,344,726 | 8/1982 | Natta ................................ 414/537 X |
| 4,684,311 | 8/1987 | Dickson-Wright et al. ....... 414/535 |
| 4,697,449 | 10/1987 | Harsch et al. .................... 198/740 X |
| 4,850,788 | 7/1989 | Dickson ............................ 414/537 |

FOREIGN PATENT DOCUMENTS

| | | | |
|---|---|---|---|
| 2573372 | 5/1986 | France | 414/535 |
| 120181 | 9/1979 | Japan | 414/535 |

OTHER PUBLICATIONS

Keith Mfg. Co. brochure, Apr. 12, 1991; Madras Oregon.

*Primary Examiner*—William P. Neuder
*Attorney, Agent, or Firm*—Donald E. Stout; Gregory A. Cone; John P. Scholl

[57] ABSTRACT

Fixed parallel cargo rails are positioned on the cargo bed floor of an aircraft, spaced sufficiently to fit a pallet snugly therebetween. A plurality of collinear slots arranged along the length of the cargo bed floor are positioned just inboard of each rail. The slots are evenly spaced and oriented lengthwise with respect to the cargo bed floor. A dog extends above the cargo bed floor from each slot and is adapted to engage a notch in the cargo. While engaged, the dog is adapted to move along its slot, thereby moving the pallet lengthwise along the cargo bed floor. The pallet is passed bucket brigade style from one dog to the next.

Another aspect of the invention is the employment of movable cargo rails on the cargo ramp. The rails are slidable widthwise across the ramp within mounting slots, thus permitting the spacing between the rails to vary. The result is that loading cargo onto the ramp and aligning it with the fixed cargo rails on the cargo bed floor is made much easier.

14 Claims, 2 Drawing Sheets

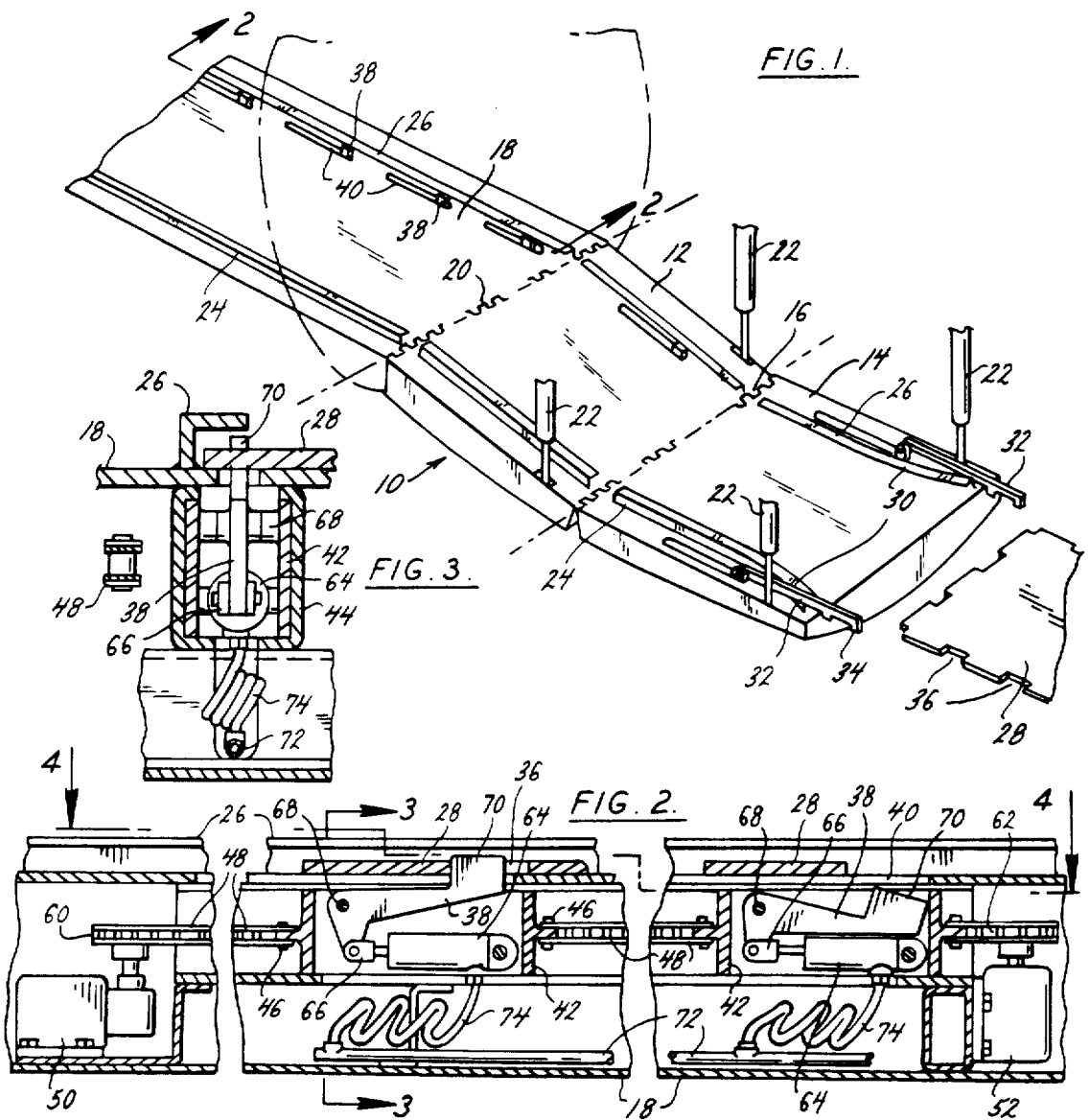
FIG. 1.
FIG. 3.
FIG. 2.
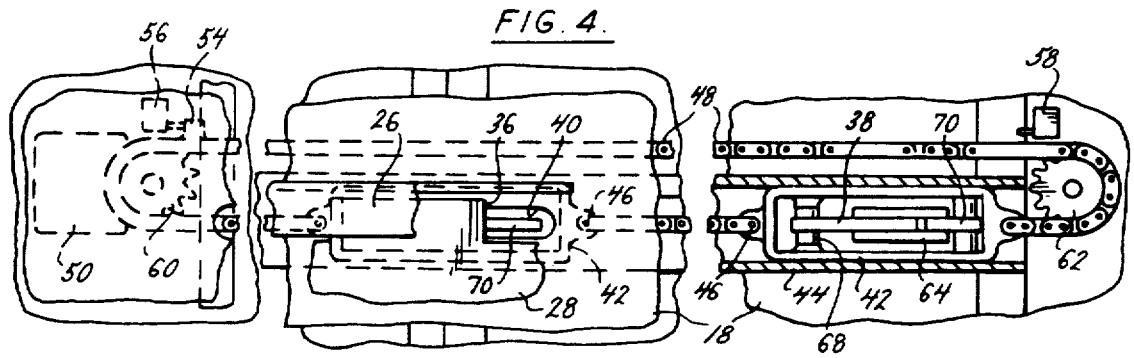
FIG. 4.

CARGO RAIL SYSTEM FOR AN AIRCRAFT

This application is related to application Ser. No. 648,279, entitled "HINGED CARGO RAMP" and Ser. No. 649,280, entitled "AIRCRAFT CARGO HANDLING SYSTEMS", both filed on even date herewith.

BACKGROUND OF THE INVENTION

This invention relates to cargo rail systems for aircraft, and more particularly to a system which incorporates movable cargo rails and a cargo conveyor system to assist in automating the aircraft loading and unloading process.

When palletized cargo is transferred to a cargo ramp on a military cargo aircraft, it is often not properly centered on the ramp and it may not be in good alignment with the axis of the aircraft. In order for the pallets to move forward, they must be both aligned and centered on the ramp. This is because the left and right edges of the pallet must fit underneath the fixed cargo floor cargo rails which are standard on military aircraft. Centering and alignment is currently typically provided by a pair of cargo rails which are flared at the aft end of the ramp so that as the pallet is put onto the ramp it is "funnelled" into position. In some cases the orientation of the rectangular pallets is different on the truck or material handling equipment than it is on the aircraft. For instance, the pallet may ride in the truck with the long dimension fore and aft, but in the plane the short dimension is fore aft. At some point, the pallet must be rotated 90 degrees. This rotation typically occurs on the cargo ramp using omnidirectional rollers and manpower. However, the cargo ramp funnel rails mentioned above interfere with this invention.

Another problem which greatly slows down the cargo loading and unloading process is moving the pallets along the cargo bed floor of the aircraft. Current practice includes pushing the load by hand as well as using a winch-driven cable to pull the load along the aircraft. There are some problems with these methods, however. One problem is that personnel are required in the cargo bay which may be exposed to chemical, biological, or conventional weapons threats. Manual pushing of the loads is slow, dangerous, and inconsistent. Cable winching of loads can move only one pallet at a time. Furthermore, none of these methods provides a positive location of the load at all times. For instance, if the aircraft is pointed downhill, alternative means of stopping or slowing the load is required.

Therefore, what is needed is a device which can align and center a pallet for widthwise or lengthwise storage without interfering with the rotation of the pallet. What is further needed is an automated device for moving palletized cargo along the length of a cargo aircraft without hands-on connection or force. This device should also be capable of positively locating and locking in place palletized cargo at all times.

SUMMARY OF THE INVENTION

This invention solves the problems outlined above by utilizing a system for moving cargo along the length of the cargo bed floor and also by utilizing movable cargo rails on the cargo ramp, which can align and center a pallet for widthwise or lengthwise storage, and can move out of the way when rotation of the pallet is necessary. Both systems are usable in combination with one another or may be used separately.

What is disclosed is a cargo handling system designed to assist in loading and moving cargo on a cargo bed floor having a length fore and aft. The cargo bed floor has a plurality of slots collinearly arranged along the length of the floor which are evenly spaced from one another. Each slot is oriented lengthwise with respect to the floor. A dog extends above the surface of the cargo bed floor from each slot. The dog can be actuated to move both fore and aft along the length of its slot. When extended, it can be engaged with a notch in the cargo, which is typically a military-style pallet, and is actuated to move from one end of the slot to the other end while being so engaged, thereby moving the cargo pallet along the length of the cargo bed floor, the cargo moving in sequence from slot to slot.

In the preferred embodiment, the cargo bed floor has two parallel fixed cargo rails on it, which are spaced widthwise sufficiently to snugly fit the pallet therebetween. Just inboard of one of the cargo rails is the plurality of slots as described above. In an identical arrangement just inboard of the other rail is a second plurality of slots, so that dogs from each set of slots engage notches on both sides of the pallet. Actuators are mounted beneath each slot for retracting each dog beneath the cargo bed floor surface when the cargo is not being moved or when returning the dog to the other end of the slot in order to continue moving the cargo. The actuators also serve to extend each dog above the cargo bed floor surface to engage one of the notches for moving the cargo.

An additional feature of the invention is that each actuator is adapted to extend each dog above the cargo bed floor surface in a locked position, with each dog engaging a notch in the cargo and thereby positively locking the cargo in place.

A second aspect of the invention is the provision of movable cargo rails on the aircraft cargo ramp. The cargo ramp has parallel cargo rails extending along its length, with each cargo rail being mounted within at least one slot arranged widthwise with respesct to the cargo ramp. An actuator means moves each cargo rail along its respective slot, thereby varying the spacing between the cargo rails. When both of the rails are at the innermost end of their respective slots, the rails are aligned with the parallel fixed cargo rails on the cargo bed floor. Thus, if the pallet must be rotated when unloading it from a truck to the aircraft, or vice-versa, in order to get it to fit between the fixed rails of the cargo bed floor, the movable rails can be moved outboard to widen the spacing between them, allowing the pallet to be rotated without interference. When rotation is complete, the rails are moved inboard again to align with the fixed cargo bed rails, thus aligning the pallet for loading onto the aircraft from the ramp.

Therefore, it is an object of this invention to provide movable cargo rails on the cargo ramp of an aircraft or the like, to assist in loading cargo much more easily and rapidly onto the cargo bed floor.

It is further object of the invention to provide an automated system for moving cargo along the length of an aircraft cargo bed floor.

It is a further object of the invention to utilize the automated cargo moving system to positively lock cargo in place during flight operations.

The above mentioned and other objects and features of this invention and the manner of attaining them will become apparent, and the invention itself will be best understood, by reference to the following description taken in conjuction with the accompanying illustrative drawings.

BRIEF DESCRIPTION OF THE DRAWINGS

FIG. 1 is a perspective view showing a cargo ramp having various features of the invention, including cargo rails in conjuction with a cargo moving system;

FIG. 2 is a cross-sectional view along line 2—2 of FIG. 1, showing details of the cargo moving system;

FIG. 3 is a cross-sectional view along line 3—3 of FIG. 2, showing further details of the cargo moving system;

FIG. 4 is a cross-sectional view along lines 4—4 of FIG. 2, again showing details of the cargo moving system;

DETAILED DESCRIPTION OF THE DRAWINGS

Figure 5:
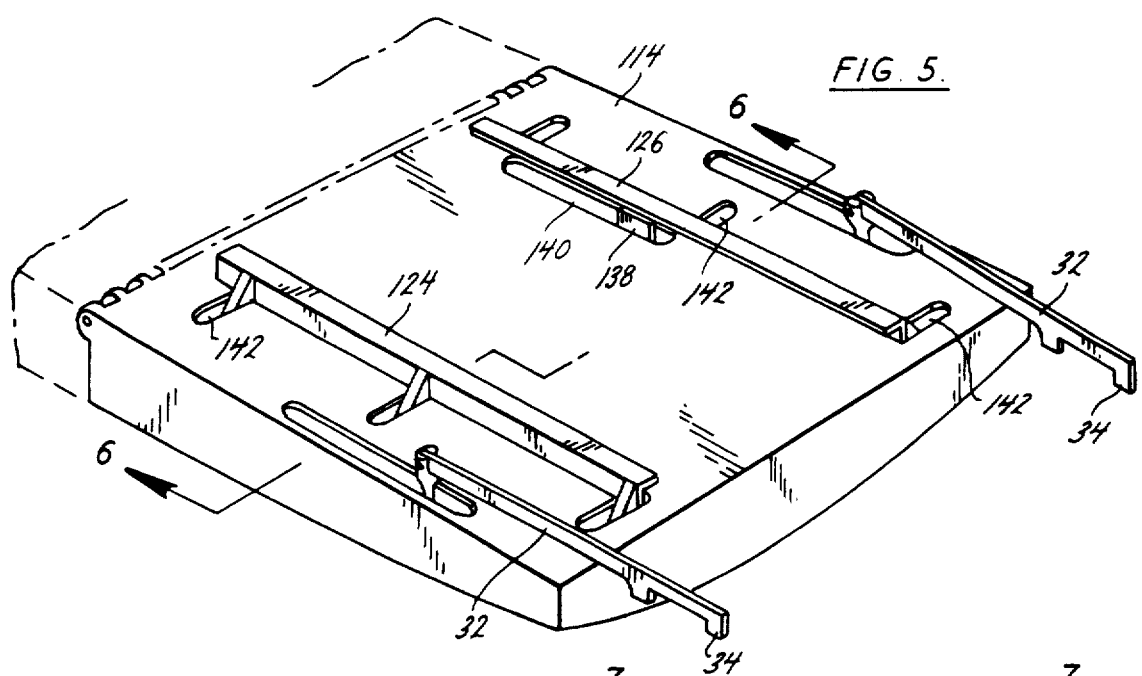
FIG. 5 is a perspective diagrammatic view of a modified embodiment of the cargo ramp, showing an adjustable cargo rail cofiguration.

Referring now to FIG. 1. there is shown a cargo ramp 10 for a cargo aircraft which embodies the cargo handling system of the invention. Cargo ramp 10 is comprised of a forward ramp section 12 and an aft ramp section 14. The two ramp sections are connected by means of a hinge 16. Hinge 16 permits relative motion between ramp sections 12 and 14 in pitch and may also permit relative motion in roll in certain embodiments. Forward ramp section 12 is connected at its forward end to the aircraft cargo bed floor 18 by means of a hinge 20, which permits relative motion between the forward ramp section 12 and the cargo bed floor 18 in pitch. Two actuators 22 are attached to each ramp section 12, 14 at one end, and the other end to some fixed point on the aircraft or on the ground, preferably the aircraft fuselage. The aircraft loadmaster may configure the ramp as desired by operation of the actuators to move each ramp section to its appropriate position. The resultant ramp offers the convenience of straight-across loading and unloading of cargo onto vehicles which have cargo bed heights different than the cargo bed height of the aircraft. Additional details of the hinged cargo ramp are disclosed in the related application entitled "HINGED CARGO RAMP", U.S. Ser. No. 648,279, filed on even date herewith and herein incorporated by reference.

Again referring to FIG. 1, a conventional fixed cargo rail system extends along the entire lengths of ramp sections 12 and 14 and also along the length of cargo bed floor 18. The cargo rail system consists of a left rail 24 and a right rail 26 which are spaced a distance apart which is sufficient to fit a standard military pallet 28 between them, with only a very slight spacing between the rails and each side of the pallet. Of course, the rails could be spaced to accommodate any other type of cargo, such as commercial pallets, depending on the type of cargo carried by the aircraft. Rails 24, 26 are "L"-shaped and the lip on each side of the pallet 28 fits under the horizontal arm of the "L" on its respective rail so that the pallet 28 is held to the floor. The vertical arm of the "L" guides the motion of the pallet along the lengths of the ramp and cargo bed floor and serves to keep the pallet centered. The aft ends 30 of each rail 24, 26 are flared outwardly in a conventional fashion to make it earier to load the pallets 28 onto the ramp 10 and between the rails 24, 26. The cargo bed floor 18 and both ramp sections 12, 14 have a plurality of rollers (not shown) on their surfaces between the rails 24, 26 which assist in the movement of the pallets 28. Pallet retainers 32 are mounted on aft ramp section 14 and have fingers 34 which interengage with notches 36 in the pallet 28 to assist in loading the pallet onto the ramp section 14, in the manner described in greater detail in the related application entitled "AIRCRAFT CARGO HANDLING SYSTEM", U.S. Ser. No. 648,280, filed on even date herewith and herein incorporated by reference. The system for moving cargo along the cargo bed floor between the rails 24, 26 comprises a series of dogs 38 which move within respective slots 40. Each rail 24, 26 has a cargo moving conveyor system associated with it, though such a system is only illustrated in conjunction with rail 26 in order to avoid cluttering the drawing.

FIGS. 2-4 show the cargo moving system in greater detail. Viewing FIGS. 2 and 4 together, it can be seen that each dog 38 in the aircraft cargo floor 18 is contained within a shuttle 42 which tranverses a channel 44. Each shuttle 42 is linked by means of pins 46 to a chain 48 so as to driven lengthwise along the cargo floor 18, along with the chain, by motors 50 and 52. Motor 50 operates in reverse direction with respect to motor 52 and the two motors operate alternately, so that the effect is to drive the chain 48 for a certain distance in one direction (aft, for example) and then to drive it an equivalent distance in the opposite direction (forwardly, in our example). Each motor is actuated by contact of a stop pin 54, which travels along with the chain 48, and its respective stop switch 56, 58, as shown in FIG. 4. Each motor drives the chain 48 through a chain idler sprocket 60, 62. Although this constitutes the preferred embodiment, the dog could also be driven along the length of the slot 40 by means of any other conventionally known means, such as a jackscrew which is driven by a geared motor.

The retraction mechanism for the dog 38 is shown in FIGS. 2 and 3. Actuator 64 is mounted within shuttle 42 and actuator shaft 66 is attached to dog 38 at its base. As seen most clearly in FIG. 3, the dog is also mounted on a pivot shaft 68. To retract the dog 38 below the surface of the cargo bed floor 18, the actuator shaft 66 is extended, thus pivoting the dog clockwise about pivot shaft 68 and thereby dropping the protruding portion 70 of dog 38 into slot 40. To extend the protruding portion 70 above the surface of the cargo bed floor in order to engage a pallet, the actuator shaft 66 is retracted, thereby rotating the dog 38 counter-clockwise about the pivot shaft 68. The actuator 64 is pneumatically driven by a source of air from a manifold 72 which is supplied to the actuator through a flexible pressure line 74. The air could be obtained from a variety of sources, such as bleed air from the engine compressor, or a dedicated system compressor. Of course, other conventional actuation systems could be employed, such as hydraulic systems, systems driven by pressurized fluid generated by an on-board inert gas generator, or a servo motor which drives the dog 38 through a gear train, without changing the scope of the invention.

The above-described cargo moving system operates to move cargo along the cargo bed floor 18. However, this system may also be employed to move cargo along the ramp sections 12, 14. In FIG. 1, a dog 38 and slot 40 combination is shown on ramp section 12. A single combination is shown for illustrative purposes, though of course a plurality of dogs and slots could be employed, depending on the length of the ramp and the desired range of motion of each dog. Additionally, though no cargo moving means is shown for the ramp section 14, one could certainly be employed, depending again on the desired system application and perceived needs. The drive system shown in FIGS. 2-4 applies specifically to the cargo moving system for the cargo bed floor, since it comtemplates driving a plurality of shuttles 42 on a single chain 48 and it would not be desirable to extend that chain onto the ramp 10. However, a similar system could be employed for the ramp cargo movers, sized in accordance with the number of dogs in the ramp mover system. In operation, a pallet 28 is loaded onto the cargo ramp 10 between the rails 24, 26 and moved into position so that one of the pallet notches 36 is engaged with the first protruding dog 38. This will occur on one of the ramp sections 12, 14 if the ramp 10 is equipped with the cargo moving system, or otherwise it will occur near the aft end of the cargo bed floor 18. Of course, since each rail 24, 26 is equipped with the cargo moving system, notches 36 on both the left and right sides of the pallet will be engaged with one of the dogs 38. At this point, motor 50 will be actuated so that the chain is driven counter-clockwise about the idler sprockets 60, 62, thus driving the dog forwardly along its slot 40 until it reaches the end of the slot. At the time the dog 38 reaches the end of the slot 40, the stop pin 54 contacts the switch 56, shutting off the operating motor and initiating operation of the other motor 52. The switch contact also actuates a central controller (not shown) which causes all of the dog actuators 64 to extend, thus retracting each of the dogs 38. The chain is thus driven in a clockwise direction, during which time all of the dogs 38 are retracted so they don't inadvertently engage the pallet notches 36 and pull the pallet back in an aft direction. When the dogs are all at the aft end of the respective slots 40 once again, the other stop pin 54 (not shown) contacts the other switch 58, shutting off motor 52 and re-energizing motor 50. This switch contact signals the central controller to retract all of the dog actuators 64, thus extending each of the dogs 38. The chain is now driven counter-clockwise again, the next protruding dog 38 now engaging a notch in the pallet 28 and pulling the pallet along further in a forward direction. This process is repeated until the pallet has been transported a desired distance along the floor 18, the pallet being passed bucket brigade style from one dog to the next. Of course, a plurality of pallets can be transported simultaneously, in a continuous line along the length of the conveyor system. Should it be desired to move the cargo pallets 28 in an aft direction, for example to unload them from the aircraft, the system may be operated in reverse.

Numerous modifications may be made to the above described conveyor system, depending on the desired operating performance and the specified design parameters for the aircraft. For example, a single reversible motor may be employed to drive the chain instead of two motors each driving the chain in opposite directions. Another possibly desirable modification would be to control each dog individually with a separate chain drive and motor combination. This would allow the dogs to be controlled sequentially, with the first dog reaching the end of its slot as the second dog started traversing its slot, and so on. The result would be a continuous motion of the pallet 28 along the conveyor, with the second dog 38 engaging the pallet as the first one disengaged. There would be no delay while all of the dogs 38 were returning from the end to the beginning of their respective slots during the return cycle. However, the control scheme for such a system would be more complex. The system would also be more costly, involving the use of a number of chain drives and motors, and would also exact a significant weight penalty. Such considerations would involve deciding between a number of tradeoffs and would depend upon the overall objectives of the entire cargo handling system.

Another significant feature of the invention is that the dogs 38 may also serve as cargo locks in flight. Once the pallets 28 have been on-loaded and are in their final flight positions, the dog actuators 64 may be extended to protrude the dogs 38 above the cargo bed floor surface, thus ensuring engagement of the dogs with the pallet notches 36 during flight operations. With the chain drives 48 locked in place for flight, the dogs thus serve as cargo locks, maintaining the pallets precisely in position for safety and enabling the loadmaster to know a pallet location precisely.

Figure 6:
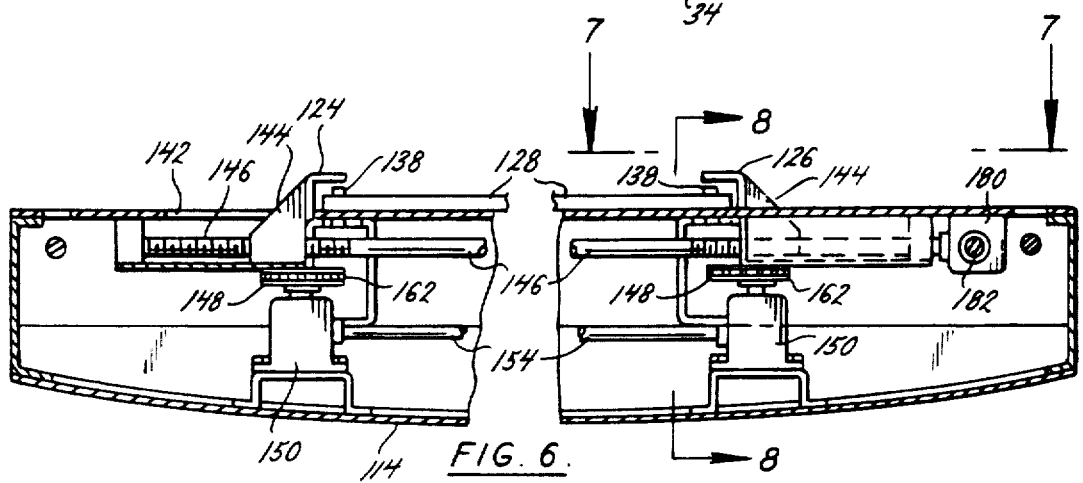
FIG. 6 is a cross-sectional view along lines 6—6 of FIG. 5, showing details of the actuator for the adjustable cargo rails.
Figure 8:
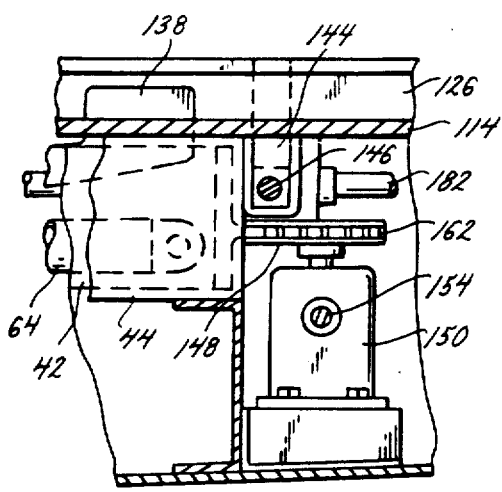
FIG. 8 is a cross-sectional view along lines 8—8 of FIG. 6, again showing further details of the adjustable cargo rails actuator.
Figure 7:
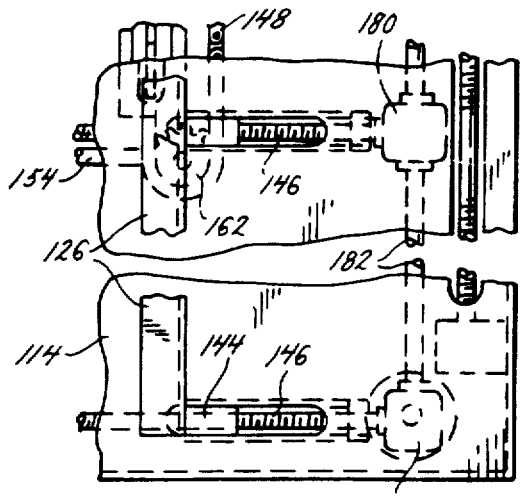
FIG. 7 is a cross-sectional view along lines 7—7 of FIG. 6, showing further details of the adjustable cargo rails actuator.

FIGS. 5-8 show an alternative embodiment which employs movable cargo rails 124, 126 on the aft ramp section 114. The cargo bed floor is configured exactly as in FIG. 1. The rails 124, 126 are designed to slide in a lateral direction inboard or outboard along slots 142. Their purpose is to facilitate loading and unloading of cargo to and from the ramp, like the flared ends 30 in the FIG. 1 embodiment, but with greater versatility. The ramp section 114 is shown having a cargo moving system as described above, with a dog 138 mounted to travel along slot 140. The dog and slot are positioned to be just inboard of the rails 124, 126 when the rails are in their innermost position, which is the normal rail position for moving cargo once it has been loaded onto the ramp. The cargo moving conveyor system operates precisely as in the FIG. 1 embodiment, and is optional on the aft cargo ramp section 114, as in the FIG. 1 embodiment. Viewing FIGS. 6-8, details of the actuation system for the movable rails are shown. Jackscrew blocks 144 are attached to the rails 124, 126 and act to push and pull the rails along the slots 142. The jackscrew blocks are threadedly mounted on a jackscrew 146, such that when the jackscrew is rotated the blocks move inwardly or outwardly, depending upon the direction of rotation of the jackscrew. In the embodiment shown, there is one jackscrew 146 for each set of opposing jackscrew blocks, the jackscrew blocks 144 for rail 124 being oppositely threaded onto the jackscrew 146 with respect to the jackscrew blocks 144 for rail 126, in order to ensure that the respective opposing blocks will move in opposite directions despite being mounted on the same jackscrew. Viewing FIG. 6, synchronized motors 150 are depicted, which correspond to motors 50 in the FIG. 1 embodiment, and which act to drive chain idler sprockets 162, which in turn drive chains 148 to move dogs 138. This system serves to ensure uniform output, thereby ensuring that the dogs 138 for both rails 124, 126 move exactly uniformly with respect to one another, so that the pallet 128 advances along the rails in an even manner. Motors 152 (not shown) may be similarly synchronized. Such a system using synchronized motors could also be employed in the FIG. 1 embodiment. In the alternative, one of the motors 150 could instead comprise a differential gearbox, driven by the other motor 150 through common shaft 154. Both the motor and the gearbox would in turn drive their respective pallet mover conveyors, ensuring synchronous movement of the conveyor systems for each rail 124, 126 with respect to one another. Referring now more particularly to FIGS. 6 and 7, it can be seen that the drive mechanism for jackscrews 146 comprises a series of differential gearboxes 180, which are driven by a single motor (not shown) through a shaft 182. Thus, each jackscrew is driven at exactly the same rotational speed, ensuring an even movement of the rails 124, 126. Of course, as in the FIG. 1 embodiment, two separate motors 150 and two additional separate motors 152 could be used to drive the cargo moving conveyor and specifically dogs 138, being controlled by some other well known means to produce a uniform output. Regarding the jackscrew drive means, jackscrews 146 could alternatively be driven individually by separate synchronized drive motors and gearboxes. Furthermore, separate jackscrews 146 could be employed with respect to each rail 124, 126, rather than extending one jackscrew across the width of the cargo ramp to drive opposing jackscrew blocks 144. Alternatively, the rails could be moved by means of a chain drive system or hydraulically. A means would be provided to synchronize the movement of each of the blocks 144 on each rail so that the rail stayed in alignment. All of these equivalents would be within the scope of this invention for either embodiment and may occur to one of ordinary skill in the art. However, regardless of the drive mechanism employed, control of rail movement is obtained by controlling the motors and actuators either by manual switches or by an automated control sequence actuated by the loadmaster and dependent upon the cargo being loaded or unloaded.

In operation, to load a pallet onto the aircraft, the rails 124 and 126 are moved outboard to create the greatest possible distance between the rails. To move the rails, shaft 182 is driven to rotate by the aforementioned motor (not shown), the shaft in turn driving each jackscrew 146 through their respective differential gearboxes 180 in a uniform manner. The threaded engagement between the jackscrew blocks 144 and the jackscrews 146 causes both blocks 144 on each jackscrew 146 to move outboard along slots 142, thereby creating a greater spacing between rails 124 and 126. With this additional spacing, the pallet 128 is easily loaded onto the ramp between the rails 124, 126., using the pallet retainers 132 if desired, and rotated if necessary to the proper orientation for fitting between the cargo bed floor rails. When the loading is complete, the rails are moved inboard again to their in-flight position at the inner end of the slot 142, by rotating shaft 182 in the opposite direction, thereby rotating the jackscrews 146 in the opposite direction. At this point, the pallet is aligned and centered on the ramp section 114, with the left and right edges snugly fitted between the rails 124, 126, and ready for transport by the cargo moving system onto the cargo bed floor of the aircraft.

Although exemplary embodiments of the invention have been shown and described, many changes, modifications, and substitutions may occur to one of ordinary skill in the art without departing from the spirit and scope of the invention. In particular, it may be noted that this invention could be used with any state of the art cargo ramp for any type of transport vehicle, and is not in any way limited to use with segmented, hinged cargo ramps, nor is it limited to aircraft applications.

We claim:

1. A cargo handling system for loading, unloading, and securing cargo, said cargo handling system comprising:
   a cargo bed floor having a length fore and aft, said cargo bed floor having a plurality of slots collinearly arranged along the length of said floor, said slots being evenly spaced from one another, each said slot being oriented lengthwise with respect to said floor;
   a dog extending above the surface of said cargo bed floor from each slot, each said dog being capable of moving both fore and aft along the length of each said slot;
   each said dog being adapted to engage with a notch in said cargo when in its extended position, and being further adapted to move from one end of said slot to the other end thereof while being so engaged, thereby moving said cargo along the length of said cargo bed floor.

2. The cargo handling system as recited in claim 1, wherein said cargo bed floor further comprises:
   a second plurality of slots collinearly arranged along the length of said floor, said second plurality of slots being spaced from said plurality of slots widthwise with respect to said cargo bed floor, said second plurality of slots being identical to and parallel to said plurality of slots, and having identical dogs extending above the surface of said cargo bed floor therefrom;
   wherein said dogs extending from said plurality of slots are adapted to engage notches on one side of said cargo and said dogs extending from said second plurality of slots are adapted to engage notches on the other side of said cargo, each said dog being further adapted to move from one end of each said slot to the other end thereof while being so engaged, thereby moving said cargo along the length of said cargo bed floor, said cargo moving in sequence from slot to slot.

3. The cargo handling system as recited in claim 1, wherein said cargo bed floor further comprises:
   parallel fixed cargo rails extending along the length of said cargo bed floor and being spaced widthwise sufficiently to accommodate a cargo pallet therebetween, said cargo pallet fitting snugly between said rails.
   said plurality of slots being arranged just inboard of one of said rails, each said dog being adapted to engage a notch along the side of said cargo pallet when in its extended position, and being further adapted to move from one end of each said slot to the other end thereof while being so engaged, thereby moving said cargo pallet along the length of said cargo bed floor between said rails.

4. The cargo handling system as recited in claim 3, wherein said cargo bed floor further comprises:
   a second plurality of slots collinearly arranged along the length of said floor, said second plurality of slots being spaced widthwise from said plurality of slots and being arranged just inboard of the other of said rails, said second plurality of slots being identical to said plurality of slots and having identical dogs extending above the surface of said cargo bed floor therefrom;

wherein said dogs extending from said plurality of slots are adapted to engage notches on one side of said cargo pallet and said dogs extending from said second plurality of slots are adapted to engage notches on the other side cargo pallet, each said dog being further adapted to move from one end of each said slot to the other end of thereof while being so engaged, thereby moving said cargo pallet along the length of said cargo bed floor between said rails.

5. The cargo handling system as recited in claim 1, and further comprising actuators mounted beneath each said slot for retracting each said dog beneath said cargo bed floor surface when said cargo is not being moved or when returning said dog to the other end of said slot in order to continue moving said cargo and for extending each said dog above said cargo bed floor surface to engage one of said notches for moving said cargo.

6. The cargo handling system as recited in claim 5, wherein each said actuator is adapted to extend each said dog above said cargo bed floor surface in a locked position, each said dog engaging a notch in said cargo and thereby positively locking said cargo in place.

7. The cargo handling system as recited in claim 3 and further comprising:

at least one cargo ramp section, said cargo ramp section being attached to the aft end of said cargo bed floor;

parallel cargo rails extending along the length of said cargo ramp section, each said cargo rail being mounted within at least one slot arranged widthwise with respect to said cargo ramp section;

actuator means for moving each said cargo rail along its respective slot, thereby varying the spacing between said cargo rails.

8. The cargo handling system as recited in claim 7 wherein when said rails are both at the innermost end of their respective slots, said rails are aligned with said parallel fixed cargo rails on said cargo bed floor.

9. A cargo handling system for loading and unloading cargo, said cargo handling system comprising:

a cargo bed floor having a length fore and aft, said cargo bed floor having parallel fixed cargo rails extending along its length and being spaced widthwise sufficiently to accommodate a cargo pallet therebetween, said cargo pallet fitting snugly between said rails;

at least one cargo ramp section, said cargo ramp section being attached to the aft end of said cargo bed floor;

parallel cargo rails extending along the length of said cargo ramp section, each said cargo rail being mounted within at least one slot arranged widthwise with respect to said cargo ramp section; and actuator means for moving each said cargo rail along its respective slot, thereby varying the spacing between said cargo rails.

10. The cargo handling system as recited in claim 9, wherein when said rails are both at the innermost end of their respective slots, each rail is aligned with said parallel fixed cargo rails on said cargo bed floor.

11. The cargo handling system as recited in claim 9, said cargo bed floor further comprising:

a plurality of slots collinearly arranged along the length of said floor and just inboard of one of said fixed cargo rails, said slots being evenly spaced from one another, each said slot being oriented lengthwise with respect to said floor;

a dog extending above the surface of said cargo bed floor from each slot, each said dog being capable of moving both fore and aft along the length of each said slot;

each said dog being adapted to engage a notch in said cargo pallet when in its extended position, and being further adapted to move from one of said slot to the other end thereof while being so engaged, thereby moving said cargo pallet along said the length of said cargo bed floor between said rails, said cargo moving in sequence from slot to slot.

12. The cargo handling system as recited in claim 11, wherein said cargo bed floor further comprises:

a second plurality of slots collinearly arranged along the length of said floor, said second plurality of slots being spaced widthwise from said plurality of slots and being arranged just inboard of the other of said rails, said second plurality of slots being identical to said plurality of slots and having identical dogs extending above the surface of said cargo bed floor therefrom;

wherein said dogs extending from said plurality of slots are adapted to engage notches on one side of said cargo pallet and said dogs extending from said second plurality of slots are adapted to engage notches on the other side of said cargo pallet, each said dog being further adapted to move from one end of each said slot to the other end thereof while being so engaged, thereby moving said cargo pallet along the length of said cargo bed floor between said rails.

13. The cargo handling system as recited in claim 12, and further comprising actuators mounted beneath each said slot for retracting each said dog beneath said cargo bed floor surface when said cargo is not being moved or when returning said dog to the other end of said slot in order to continue moving said cargo and for extending each said dog above said cargo bed floor surface to engage one of said notches for moving said cargo.

14. The cargo handling system as recited in claim 13, wherein each said actuator is adapted to extend each said dog above said cargo bed floor surface in a locked position, each said dog engaging a notch in said cargo and thereby positively locking said cargo in place.

* * * * *